(12) United States Patent
Kelsey

(10) Patent No.: US 6,411,959 B1
(45) Date of Patent: Jun. 25, 2002

(54) APPARATUS AND METHOD FOR DYNAMICALLY UPDATING A COMPUTER-IMPLEMENTED TABLE AND ASSOCIATED OBJECTS

(75) Inventor: Todd Mark Kelsey, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/408,404

(22) Filed: Sep. 29, 1999

(51) Int. Cl.[7] ............................................. G06F 17/30
(52) U.S. Cl. ...................... 707/101; 707/102
(58) Field of Search ................................ 707/203, 101, 707/100, 102, 103, 10, 3; 711/170

(56) References Cited

U.S. PATENT DOCUMENTS

| | | | | |
|---|---|---|---|---|
| 5,752,016 A | * | 5/1998 | Whittaker et al. | 707/3 |
| 5,930,795 A | * | 7/1999 | Chen et al. | 707/100 |
| 5,946,688 A | * | 8/1999 | Roberts | 707/10 |
| 6,014,730 A | * | 1/2000 | Ohtsu | 711/170 |
| 6,067,547 A | * | 5/2000 | Douceur | 707/100 |

* cited by examiner

Primary Examiner—Sanjiv Shah
(74) Attorney, Agent, or Firm—Martin & Associates, LLC; Derek P. Martin (57) ABSTRACT

An apparatus and method allow a user to define a dynamically extendible table in a software application, such as a spreadsheet. In one embodiment of the invention, when a new row or column is added next to a dynamically extendible table, the new row or column is automatically added to the definition of the dynamically extendible table. In a second embodiment of the invention, when a new row or column is added to a dynamically extendible table, the user is queried to determine whether the row or column should be added to the dynamically extendible table. In yet another embodiment, a user adds a row or column, then invokes a command to add the row or column to a dynamically extendible table. In one embodiment, once a dynamically extendible table has been updated to include a new row or column, any objects that use the dynamically extendible table as a data source are updated to include the new data. Because the name of the object doesn't change, all documents that reference the old object will automatically reference the new object without changing any of the references in the documents. In another embodiment, once a dynamically extendible table has been updated to include a new row or column, all of the documents that reference an object that uses the table as a data source are then updated as required so that they reference either the old object or the new object, whichever is appropriate. As a result, all documents that reference the object and that require updating will refer to the new object automatically without requiring that the user manually create a new object to include the new row or column and manually change references to the old object to now refer to the new object. The present invention thus allows a user to add a row or column to a table, and the new data is then represented in objects that require updating.

20 Claims, 7 Drawing Sheets

|  | 1996 | 1997 | 1998 | 1999 |
|---|---|---|---|---|
| N. America | 2.2 | 2.9 | 2.6 | 2.5 |
| S. America | 1.0 | 2.0 | 3.0 | 4.0 |
| Europe | 3.3 | 3.4 | 3.0 | 4.5 |
| Africa | 2.0 | 4.0 | 3.0 | 4.0 |
| Asia | 3.0 | 3.0 | 3.5 | 4.0 |

APPARATUS AND METHOD FOR DYNAMICALLY UPDATING A COMPUTER-IMPLEMENTED TABLE AND ASSOCIATED OBJECTS

BACKGROUND OF THE INVENTION

1. Technical Field

The present invention relates in general to the data processing field. More specifically, the present invention relates to tables implemented in software executing on a general purpose digital computer.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Tables are a common data structure used by many software applications. A spreadsheet is an example of a software application that implements a table, and that can perform various numerical and other operations on information that a user enters into the table. A spreadsheet typically has rows and columns of individual "cells", which can each contain information. The user can define various formulas in some of the cells for operating on the information residing in other cells. Examples of known spreadsheets include Lotus 1-2-3, Microsoft Excel, and Corel Quattro-Pro.

Modem spreadsheets typically provide functions that allow the user to select a block of rows and columns, and define tables, graphs, or other objects in various formats that reference and/or represent the data in the selected rows and columns. For example, a financial report for a company might include the rows of annual gross sales, cost of goods sold, and net profit in columns that represent different years. A user could select the data and define a bar chart object (or other type of object) that would graphically display each of these three items for each of the selected years.

Many modem applications allow referencing spreadsheet objects. For example, Microsoft provides an Object Link and Embed (OLE) capability in Excel that allows a spreadsheet object (such as a graph) to be defined as an OLE object and used in another document or application, such as a word processor. When existing data in the table changes, the data in the corresponding table or graph in the word processor automatically changes as well, eliminating the need to manually re-create tables and graphs that are generated from a spreadsheet. However, current technologies (such as OLE) that enable creation of objects do not recognize the addition of new data in a spreadsheet table. An OLE object has a data source that is defined by a fixed field of rows and columns, and anything outside that fixed field is not represented in the OLE object. As a result, when a new row or column is added to a spreadsheet table, the user must manually generate a new OLE object to include the new data. Because the spreadsheet controls the names of its objects, the user has no way to rename the new object so that existing documents can reference the new object instead of the old. Instead, the user must manually determine where the old object was used, and manually put in references to the new object. Needless to say, if an object is used in several different documents, this manual update process can become very tiresome, frustrating, and prone to error.

In most spreadsheets that track financial information, and in many other applications, new rows and/or columns will need to be added periodically as new months, quarters, and years roll by and their data becomes available. In addition, rows or columns may need to be deleted from time to time. Without an apparatus and method for automatically updating objects when new data is added to or deleted from their data source, users will continue to suffer from having to manually create new objects and replace existing references to the old object with references to the new object each and every time a new row or column is added to or deleted from the table that is the data source for the object.

DISCLOSURE OF INVENTION

An apparatus and method allow a user to define a dynamically extendible table in a software application, such as a spreadsheet. In one embodiment of the invention, when a new row or column is added next to a dynamically extendible table, the new row or column is automatically added to the definition of the dynamically extendible table. In a second embodiment of the invention, when a new row or column is added to a dynamically extendible table, the user is queried to determine whether the row or column should be added to the dynamically extendible table. In yet another embodiment, a user adds a row or column, then invokes a command to add the row or column to a dynamically extendible table. In one embodiment, once a dynamically extendible table has been updated to include a new row or column, any objects that use the dynamically extendible table as a data source are updated to include the new data. Because the name of the object doesn't change, all documents that reference the old object will automatically reference the new object without changing any of the references in the documents. In another embodiment, once a dynamically extendible table has been updated to include a new row or column, all of the documents that reference an object that uses the table as a data source are then updated as required so that they reference either the old object or the new object, whichever is appropriate. As a result, all documents that reference the object and that require updating will refer to the new object automatically without requiring that the user manually create a new object to include the new row or column and manually change references to the old object to now refer to the new object. The present invention thus allows a user to add a row or column to a table, and the new data is then represented in objects that require updating.

The foregoing and other features and advantages of the invention will be apparent from the following more particular description of preferred embodiments of the invention, as illustrated in the accompanying drawings.

BEST MODE FOR CARRYING OUT THE INVENTION

According to preferred embodiments of the present invention, an apparatus and method define a dynamically extendible table or table portion that recognizes when a new row or column is added to the table and that can automatically generate one or more new objects that include the new data, and that modifies documents that reference the old object to reference either the old object or the new object, as is appropriate.

Figure 1:
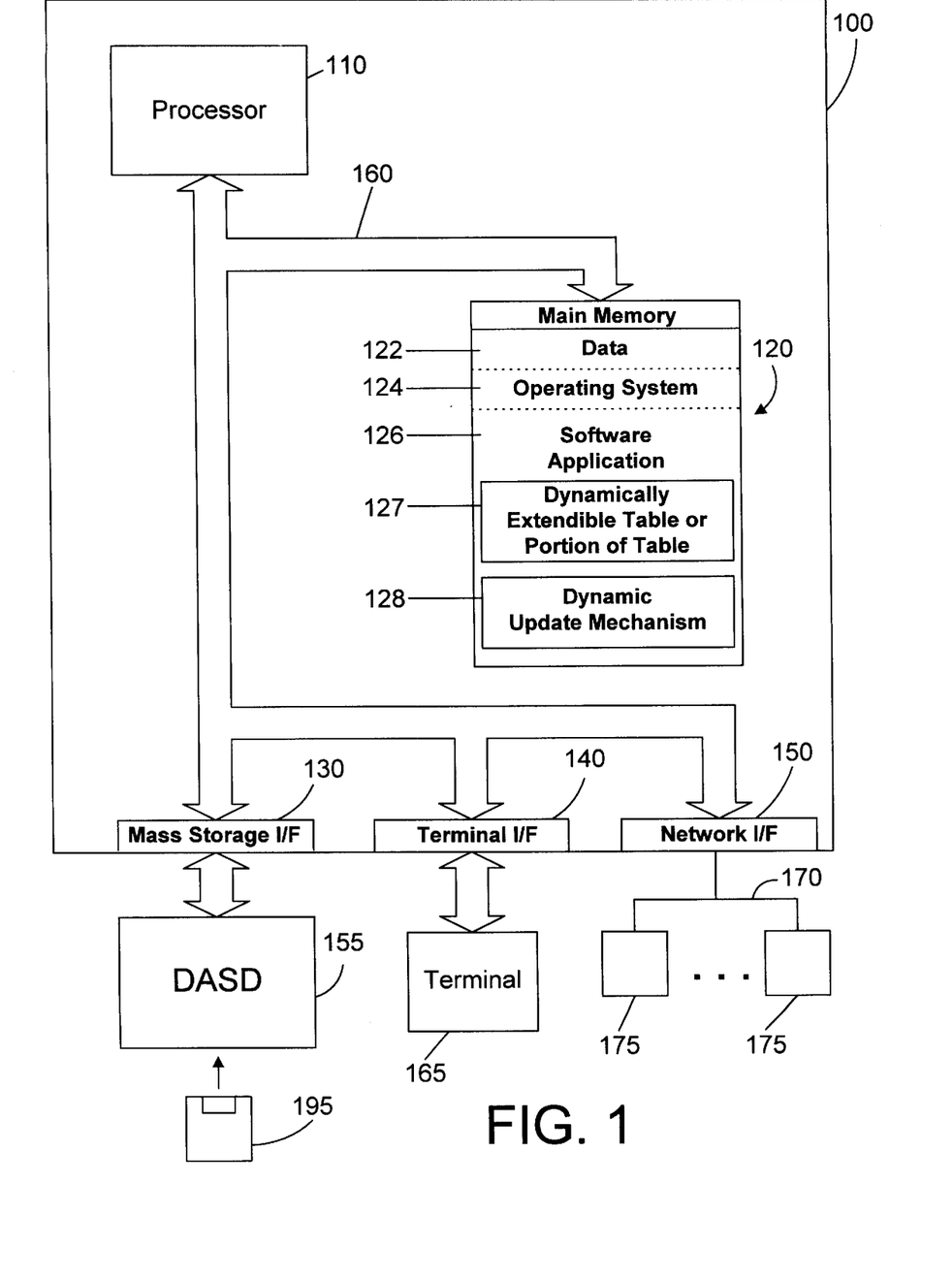
FIG. 1 is a block diagram of a computer apparatus in accordance with preferred embodiments of the present invention.

Referring to FIG. 1, a computer system 100 in accordance with the preferred embodiment is an IBM RS/6000 computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device 155 is a floppy disk drive, which may store data to and read data from a floppy disk 195.

Main memory 120 in accordance with the preferred embodiments contains data 122, an operating system 124, and a software application 126. Software application 126 includes a dynamically extendible table or portion of a table 127, and a dynamic update mechanism 128. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, and software application 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as AIX; however, those skilled in the art will appreciate that the spirit and scope of the present invention is not limited to any one operating system.

Software application 126 is a software application that allows entering and manipulating information in a table. One suitable type of software application 126 is a spreadsheet application, similar to known spreadsheet applications such as Lotus 1-2-3, Microsoft Excel, and Corel Quattro-Pro. However, unlike these prior art spreadsheet applications, software application 126 in accordance with the preferred embodiments includes a dynamically extendible table or portion of a table 127 and a dynamic update mechanism 128. The examples provided herein assume a spreadsheet table to illustrate one specific implementation in accordance with the preferred embodiments. Of course, other software applications that implement tables are also within the scope of the preferred embodiments as well. For the sake of convenience, the terms "dynamically extendible table" and "dynamically extendable table portion" are used interchangeably herein to generically refer to both whole tables or portions of tables. A dynamically extendible table 127 is a special type of table that allows the dynamic update mechanism 128 to detect when a row or column is added to the table or deleted from the table. When a row or column is added to or deleted from a dynamically extendible table 127, dynamic update mechanism 128 automatically determines whether any defined objects reference the data in the dynamically extendible table. If so, the dynamic update mechanism 128 automatically updates references to the object within documents, when required, so that documents can automatically reference a new object that includes information from the new data entered into the table 127.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/ Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2A:
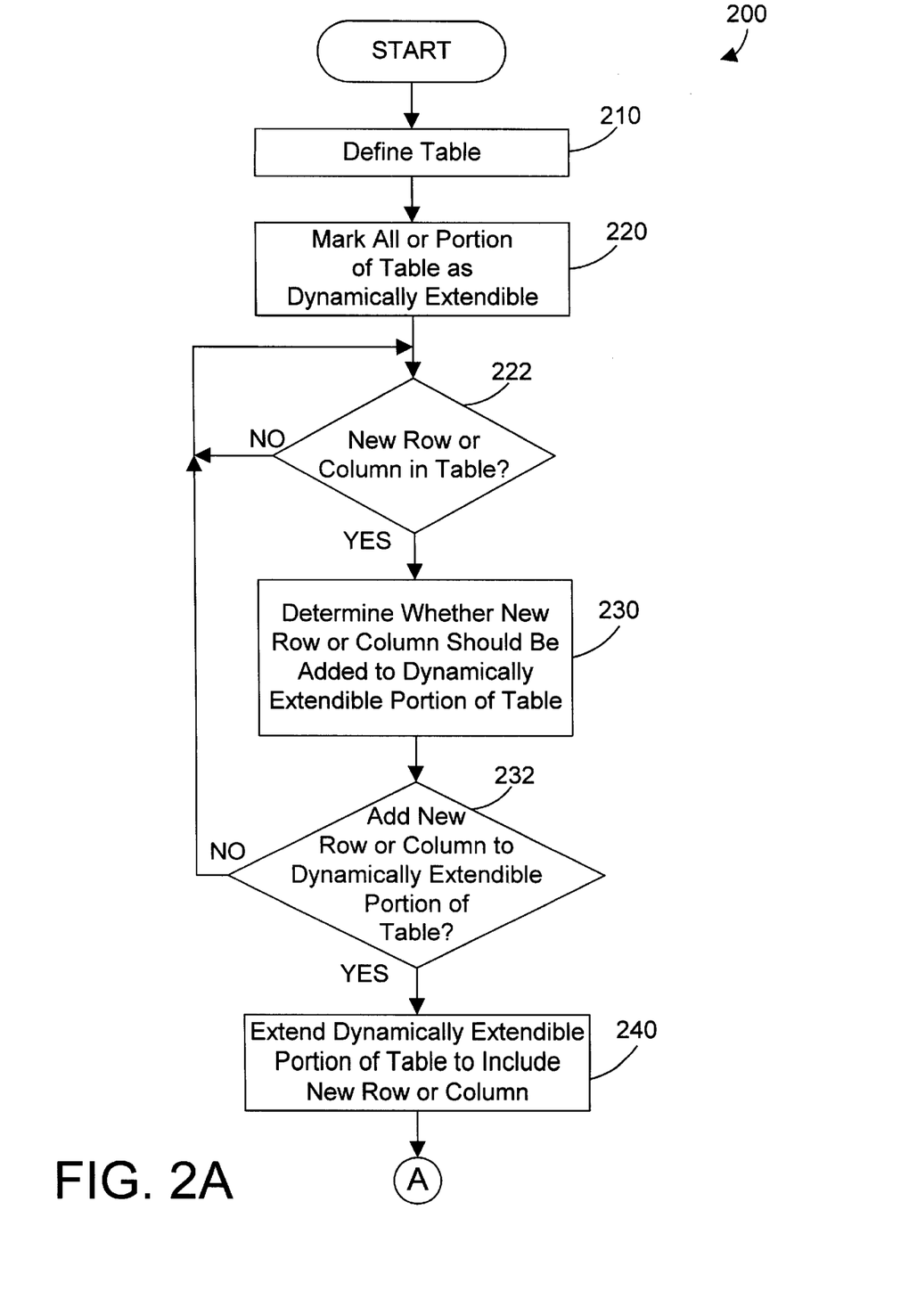
FIGS. 2A, 2B and 2C each represent portions of a flow diagram showing the steps in a method in accordance with the preferred embodiments.
Figure 2B:
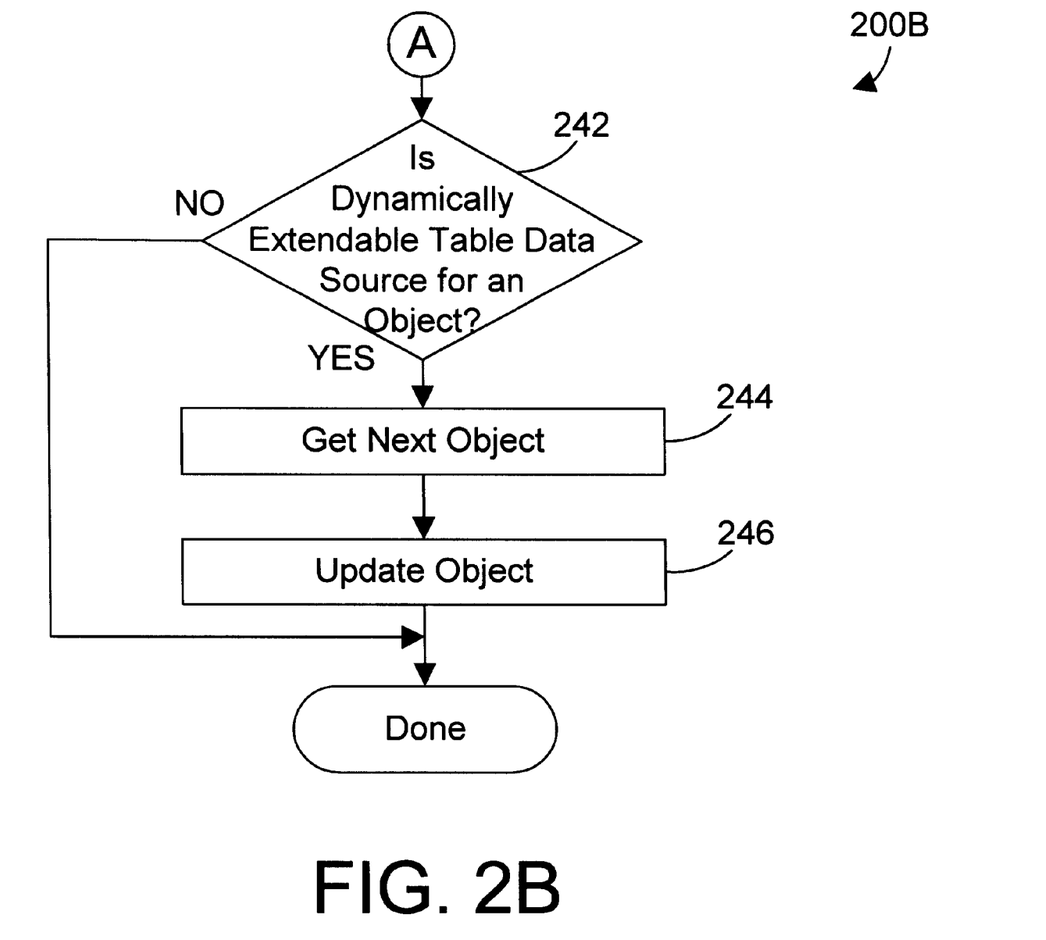
Figure 2C:
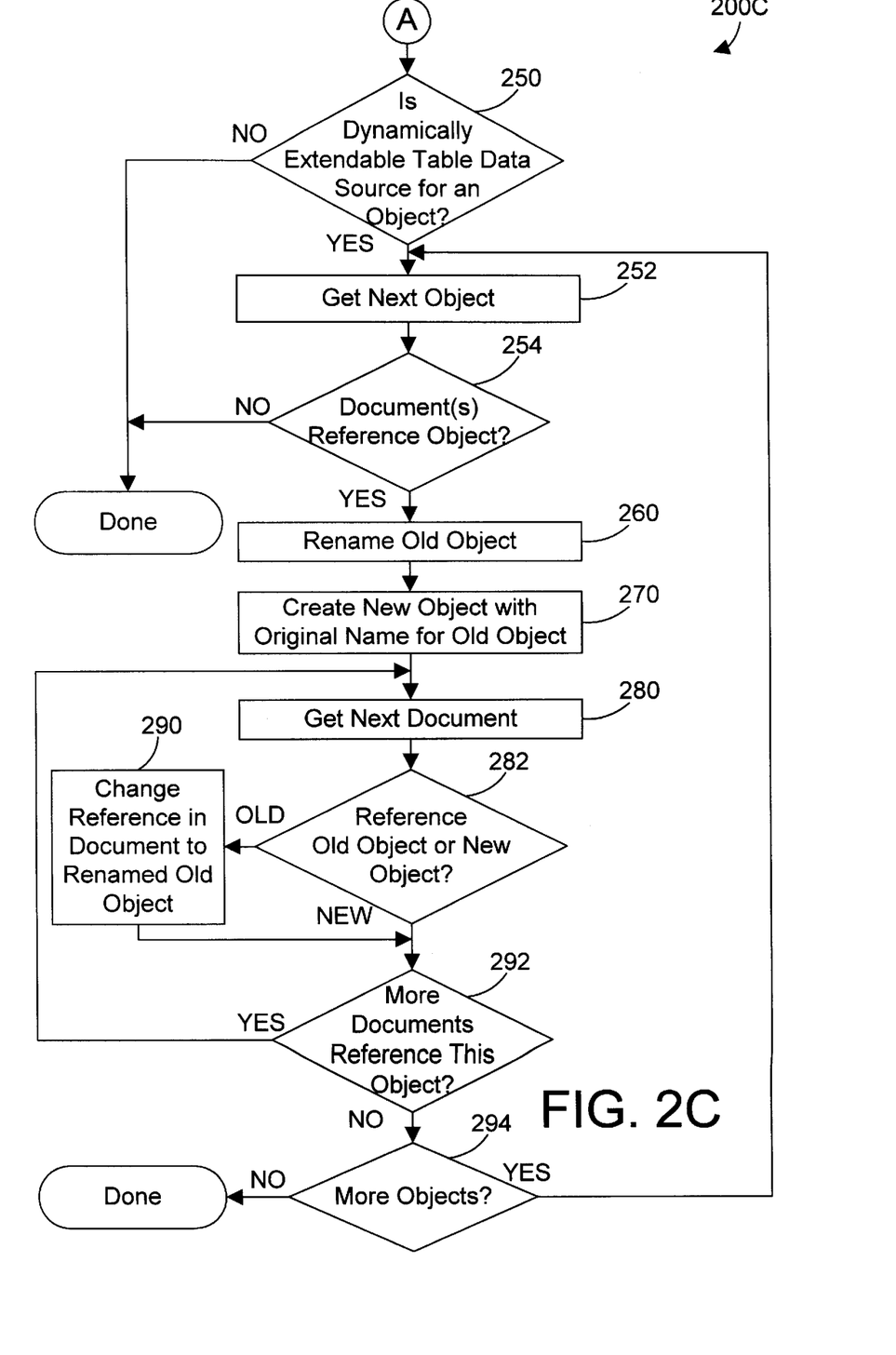

Referring now to FIGS. 2A–2C, a method 200 represents steps that may be performed by dynamic update mechanism 128 of FIG. 1 in accordance with the preferred embodiments. First, a table in a spreadsheet is defined (step 210), preferably in a manner consistent with known techniques for creating a spreadsheet table. Next, a table or portion of the table is marked as being dynamically extendible (step 220). Any suitable method for marking a table or table portion is within the scope of the preferred embodiments. For example, a user could click on the upper-left cell in the table, and drag the pointer to the lower-right cell in the table to select all the cells in the table. The user could then select a menu function or press a key sequence that causes the table portion with the selected cells to be marked as dynamically extendible. At this point the dynamic extendability of the table portion does not come into play until a user makes a change to the dynamically extendable table portion, such as the addition or deletion of a row or column. Method 200 illustrates the steps taken when a row or column is added to the table (step 222) in the immediate vicinity of the dynamically extendible table portion. When method 200 detects that a new row or column has been added in proximity to the dynamically extendible table portion (step 222=YES), it must determine whether the new row or column should be added to the dynamically extendible table portion (step 230). If the new row or column is not to be added to the dynamically extendible table portion (step 232=NO), method 200 awaits the next change in the vicinity of the dynamically extendible table portion (step 222). If the new row or column is to be added to the dynamically extendible table (step 232=YES), the dynamically extendible table portion is extended to include the newly added row or column (step 240). Note that there are several ways to decide whether or not to add the new row or column to the dynamically extendible table in step 232. In one embodiment of the invention, any row or column that is added directly next to a dynamically extendible table is automatically made part of the dynamically extendible table by the dynamic update mechanism 128. In another embodiment, when a row or column is added directly next to a dynamically extendible table, the dynamic update mechanism 128 prompts the user and asks whether the new row or column should be added to the dynamically extendible table. In yet another embodiment, a user adds a row or column, and invokes a command to add the selected row or column to a dynamically extendible table. Step 232 expressly encompasses any suitable way of determining whether or not to add a new row or column to a dynamically extendible table.

Once step 240 has been performed, the dynamically extendible table includes the new row or column, but objects that reference data in the dynamically extendible table have not yet been affected. Two different embodiments are disclosed herein for determining which actions are appropriate once a dynamically extendible table portion has changed size by the addition or deletion of a row or column, which are discussed below.

The first embodiment assumes that a change to a dynamically extendible table that is a data source for an object should cause the object to be automatically updated to reflect the change in the table. Referring to FIG. 2B, if data within the dynamically extendible table that was just changed is a data source for one or more objects (step 242=YES), an object is retrieved (step 244) and updated (step 246). If data within the dynamically extendible table is not a data source for any object (step 242=NO), no action is required, because there are no corresponding objects that use the data in the dynamically extendible table. This flow 200B assumes that dynamic update mechanism 128 can delete the old object, create a new object that reflects the change to the dynamically extendible table, and name the new object with the same name as the old object. By updating the object but retaining the same name, all documents, if any, that reference the object will now reference the updated object without any change to the documents themselves. Note that the steps in FIG. 2B provide one suitable way for updating an object, but other ways of updating an object are within the scope of the preferred embodiments.

While the fully automatic update feature in the first embodiment may be useful in many contexts, there are some cases where automatically updating an object may not be desired. For example, some documents need to be maintained in their present state for archival purposes, and updating an archive document with a change to a table may not be desired. For this reason, the second embodiment as described in reference to FIG. 2C allows for maintaining the old object while still creating a new object that represents the change to the dynamically extendible table.

Referring now to FIG. 2C, a method 200C in accordance with the second embodiment first determines whether the dynamically extendible table is a data source for one or more objects (step 250). If not (step 250=NO), no action is required, and method 200C is done. If so (step 250=YES), an object is retrieved (step 252), and step 254 determines whether the object is used in any documents. If no documents reference the object (step 254=NO), no action is required, and method 200C is done. If one or more documents reference the selected object (step 254=YES), the old object is renamed (step 260), and a new object is created with the old object's original name (step 270). A document that references the object is then retrieved (step 280). Because the new object has the same name as the original old object, any document that should reference the new object (step 282=NEW) automatically references the new object without any change to the document. However, any document that should reference the old object (step 282=OLD) is modified so that its reference to the object is changed to reference the renamed old object (step 290). If more documents reference the object (step 292=YES), the other documents are processed in the same manner. Once no more documents reference the current object (step 292=NO), step 294 determines whether all objects for the changed dynamically extendible table have been processed (step 294). If no objects remain (step 294=NO), method 200C is done. If more objects remain (step 294=YES), the next object is selected (step 252), and the process continues until all objects have been processed (step 294=NO).

Note that the flow of FIG. 2C makes some assumptions. For example, because the new object is renamed to the original object name, references in the documents that should refer to the new object do not have to be changed. This assumes that the majority of documents need to reference objects that should change with changes to their underlying tables, and only those that need to remain the same have their references changed to refer to the renamed old object. This assumption could just as easily be reversed, which would mean that the new object is given a new name, references that should reference the old object would require no change, while references that should reference the new object would have to be explicitly updated in the documents. In addition, while the methods of FIGS. 2A–2C relate to the addition of a row or column, similar steps could be taken within the scope of the preferred embodiments to delete a row or column from a dynamically extendible table. The preferred embodiments extend to any modification to a dynamically extendible table that may be reflected in an object that uses data in the table. Furthermore, the term "document" as used herein broadly means anything that can contain a reference to an object. Word processor documents, web pages, and software applications that reference an object are all examples of "documents" as used herein. The flow of FIGS. 2A–2C are given by way of example to show one suitable implementation in accordance with the preferred embodiments, and should not be construed as limiting.

Figure 3:
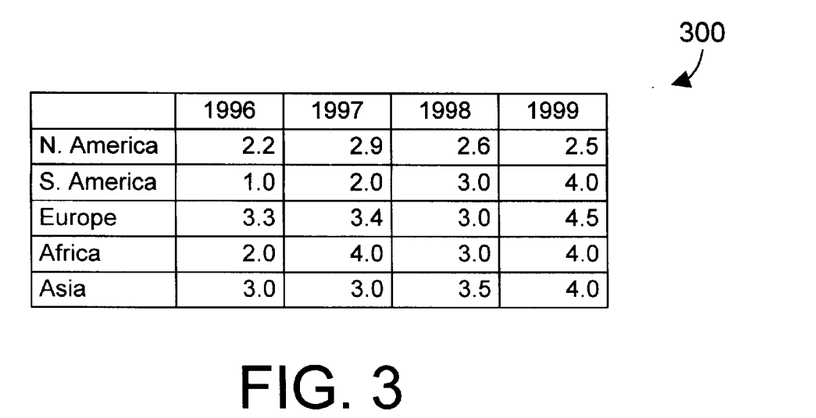
FIG. 3 shows a sample spreadsheet table.
Figure 4:
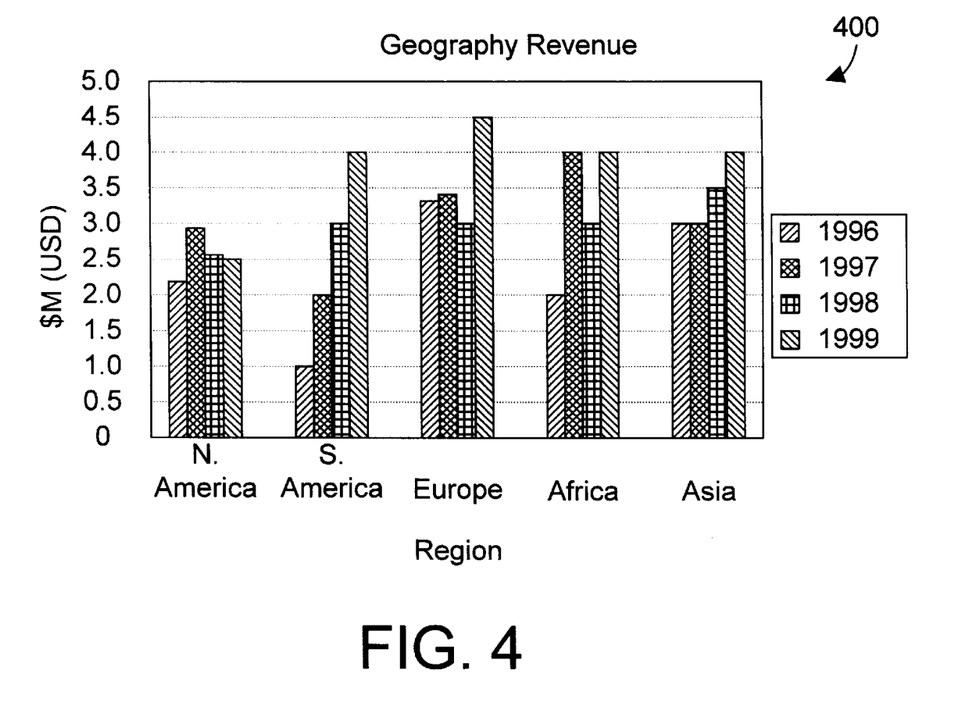
FIG. 4 shows a sample bar graph that displays data from the spreadsheet table of FIG. 3.

An example is now presented to illustrate the concepts of the preferred embodiments. A sample spreadsheet table 300 is shown in FIG. 3. This table 300 lists revenue, in millions of dollars, for five regions, namely North America, South America, Europe, Africa, and Asia, for the years 1996, 1997, 1998, and 1999. An object 400 is then created which uses table 300 as a data source for a bar graph. Note that a bar graph is only one type of object that could be defined. Other types of graphs are known in the art, and include: column, pie, scatter, area, doughnut, radar, surface, bubble, and stock. Of course, graphs are just one category of possible objects that use the data in a spreadsheet table. For example, a portion of a table could be defined as an object that can be exported to a word processor. The term "object" as used herein refers to any type of item that uses data in a table, directly or indirectly. The bar graph 400 is shown as one suitable example of an object. Note that bar graph 400 groups data for each of the four years into different bars for each region.

Figure 5:
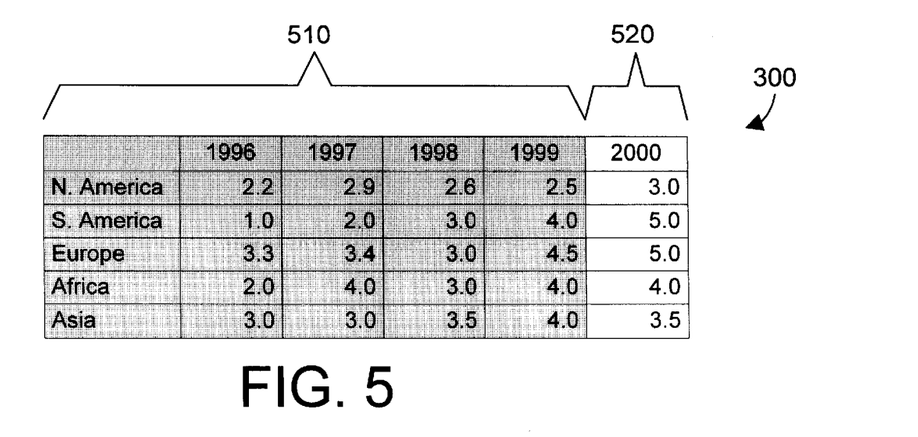
FIG. 5 shows the sample spreadsheet table of FIG. 3 with the addition of a new column of data.
Figure 6:
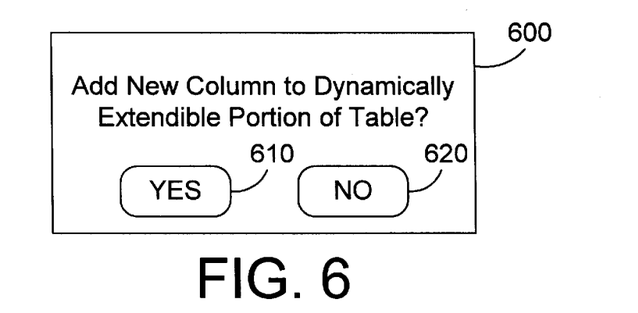
FIG. 6 shows a dialog box that allows a user to select whether or not to add the new column in FIG. 5 to the dynamically extendible portion 510 of the table 300.
Figure 7:
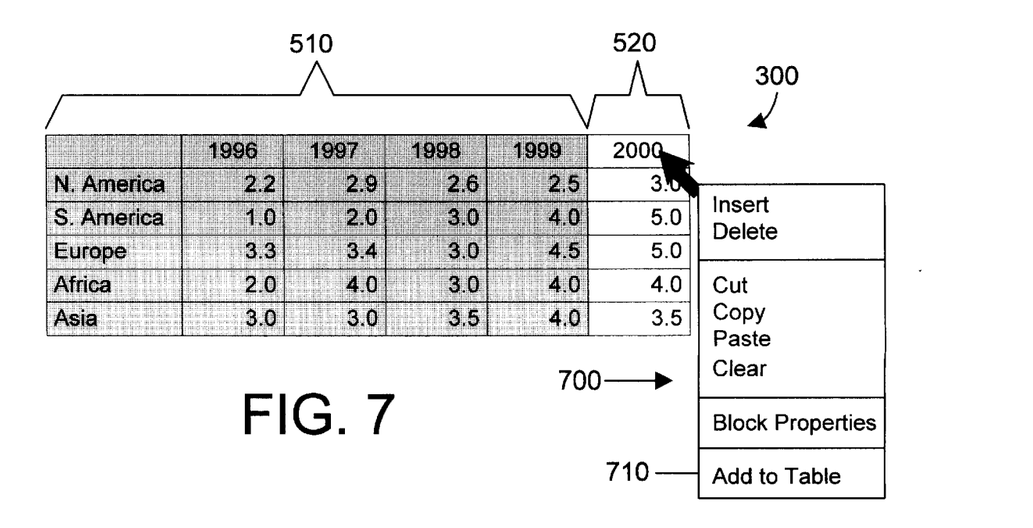
FIG. 7 is a block diagram of a dialog box that can be invoked by a user to add a row to an existing table object.

Referring now to FIG. 5, we assume that a user designates the original table shown in FIG. 3 as a dynamically extendible table in some suitable manner. For example, the spreadsheet could have a default that specifies that a table is dynamically extendible unless otherwise specified. In the alternative, the default may be a regular table, and the user designates a particular table as dynamically extendible by selecting the rows and columns in the table and selecting a menu item or key sequence to mark the table as dynamically extensible. In FIG. 5, we assume that rows and columns 510 have been designated as dynamically extendible, as shown by the shading in these cells. Once this table portion 510 is designated as dynamically extendible, any row or column that is added directly next to these can be added to the dynamically extendible portion, and objects that use the data in the table 300 may be updated to reflect the change. In the example of FIG. 5, we assume a user has added a new column 520 for revenue for the year 2000 for each of these regions. In one embodiment, the dynamic update mechanism 128 automatically detects that a new column has been added, and adds the new column into the dynamically extendible portion 510. In another embodiment, the dynamic update mechanism 128 detects that a new column has been added, and prompts the use with a dialog box 600 as shown in FIG. 6 to determine whether the new column should be added to the dynamically extendible table portion. If so, the user clicks the YES button 610, and the column 520 is then added to the dynamically extendible table portion 510. If not, the user clicks the NO button 620, and column 520 is not added to the dynamically extendible table portion 510. In yet another embodiment, the user adds the column 520, selects the new column, and invokes a command to add the column to the dynamically extendible table. One suitable way of invoking a command is shown in FIG. 7, where the user selects one or more cells in the column and right-clicks the pointer to invoke a menu 700 that includes a selection 710 to add the selected row or column to the existing dynamically extendible table. Of course, other ways of determining whether or not to add a row or column to a dynamically extendible table are possible, and are within the scope of the preferred embodiments.

Figure 8:
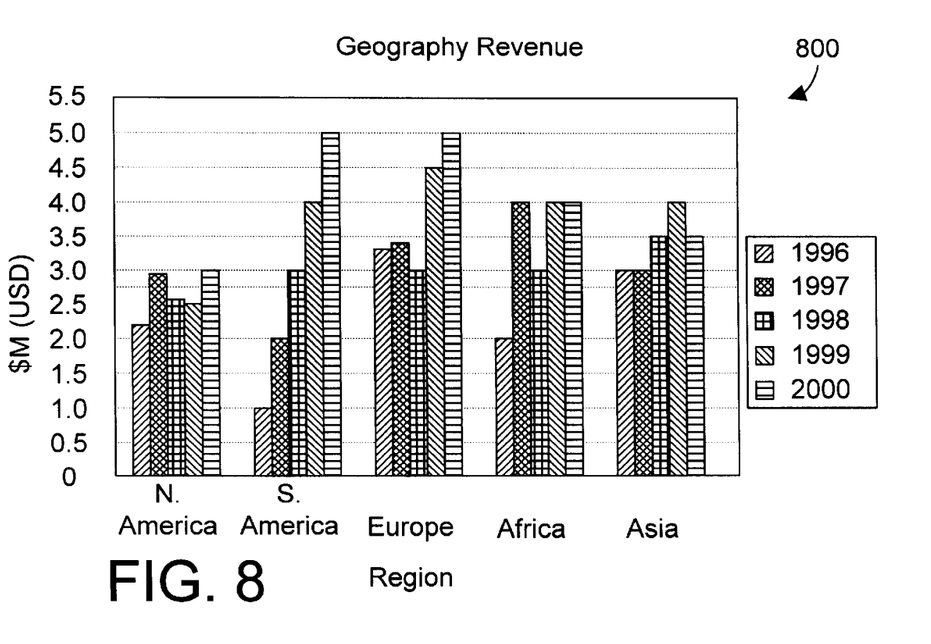
FIG. 8 shows a bar graph for the data in the spreadsheet table 300 of FIG. 5.

When a dynamically extendible table has a row or column added or deleted, and one or more objects use the data in the dynamically extendible table, one or more of the existing objects may be updated to reflect the changed table information. In the alternative, one or more new objects can be created in addition to the old objects, and object references in any documents that reference the old object can then be maintained the same or changed, depending on whether the document should be updated with new information or stay the same regardless of updates. Referring to FIG. 8, a new object 800 is created in response to the addition of column 520 to the dynamically extendible portion 510 of table 300 in FIG. 5. Object 800 is a bar graph that includes the data from the newly added column. Any document that should be updated with changes to the dynamically extendible table portion 510 will now refer to the new object 800, while documents that should not be updated will refer to the old object 300. In this manner, documents used for archival purposes can still reference the old object, while documents that need updating will automatically refer to the new object 800.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, instead of updating an object, the preferred embodiments could instead update pointers to objects. These and other variations are expressly within the scope of the preferred embodiments.

I claim:
1. An apparatus comprising:
  at least one processor;
  a memory coupled to the at least one processor;
  a software application residing in the memory and executed by the at least one processor, the software application including at least one dynamically extendible table portion and at least one object that references data in a selected dynamically extendible table portion; and
  a dynamic update mechanism residing in the memory and executed by the at least one processor, the dynamic update mechanism detecting when a row or column is added to or deleted from the selected dynamically extendible table portion, and updating the object to reflect the addition to or deletion from the selected dynamically extendible table portion.

2. The apparatus of claim 1 further comprising means for defining the selected dynamically extendible table portion.

3. The apparatus of claim 1 wherein the software application comprises a spreadsheet application.

4. The apparatus of claim 1 wherein the dynamic update mechanism further updates at least one document that references the object to reflect the addition to or deletion from the selected dynamically extendible table portion.

5. An apparatus comprising:

at least one processor;

a memory coupled to the at least one processor;

a software application residing in the memory and executed by the at least one processor, the software application including at least one dynamically extendible table portion;

a document residing in the memory, the document including at least one reference to a first object, the first object referencing data in the dynamically extendible table portion; and a dynamic update mechanism residing in the memory and executed by the at least one processor, the dynamic update mechanism detecting when a row or column is added to or deleted from the dynamically extendible table portion, creating a second object that reflects the addition to or deletion from the dynamically extendible table portion, and changing at least one reference to the first object in the document to refer to the second object.

6. The apparatus of claim 5 further comprising means for defining the selected dynamically extendible table portion.

7. The apparatus of claim 5 wherein the software application comprises a spreadsheet application.

8. A method for reflecting a change to a computer-implemented table in an object that references data in the table, the method comprising the steps of:

1) defining at least one dynamically extendible table portion, wherein the object references data in the dynamically extendible table portion;

2) detecting when a row or column is added to or deleted from the selected dynamically extendible table portion; and 3) updating the object to reflect the addition to or deletion from the selected dynamically extendible table portion.

9. The method of claim 8 wherein the computer-implemented table is implemented within a spreadsheet application.

10. The method of claim 8 further comprising the step of updating at least one document that references the object to reflect the addition to or deletion from the selected dynamically extendible table portion.

11. A method for updating at least one reference in at least one document to a first object that references data in a computer-implemented table, the method comprising the steps of:

1) defining at least one dynamically extendible table portion, wherein the first object references data in the dynamically extendible table portion;

2) detecting when a row or column is added to or deleted from the dynamically extendible table portion;

3) creating a second object that reflects the addition to or deletion from the dynamically extendible table portion; and 4) changing at least one reference to the first object in the at least one document to refer to the second object.

12. A program product comprising:

a dynamic update mechanism that detects when a row or column is added to or deleted from a dynamically extendible table portion, and that automatically updates an object that references data in the dynamically extendible table portion to reflect the addition to or deletion from the selected dynamically extendible table portion; and signal bearing media bearing the dynamic update mechanism.

13. The program product of claim 12 wherein the signal bearing media comprises recordable media.

14. The program product of claim 12 wherein the signal bearing media comprises transmission media.

15. The program product of claim 12 wherein the dynamic update mechanism is implemented in a spreadsheet application.

16. The program product of claim 12 wherein the dynamic update mechanism further updates at least one document that references the object to reflect the addition to or deletion from the selected dynamically extendible table portion.

17. A program product comprising:

(A) a dynamic update mechanism that:

1) detects when a row or column is added to or deleted from a dynamically extendible table portion that is referenced by a first object;

2) automatically creates a second object that reflects the addition to or deletion from the dynamically extendible table portion;

3) changes at least one reference to the first object in a document to refer to the second object; and (B) signal bearing media bearing the dynamic update mechanism.

18. The program product of claim 17 wherein the signal bearing media comprises recordable media.

19. The program product of claim 17 wherein the signal bearing media comprises transmission media.

20. The program product of claim 17 wherein the dynamic update mechanism is implemented in a spreadsheet application.

* * * * *